April 2, 1935.    J. N. HELTZEL    1,996,153
ROAD BUILDING APPARATUS
Filed Dec. 19, 1929    6 Sheets-Sheet 2
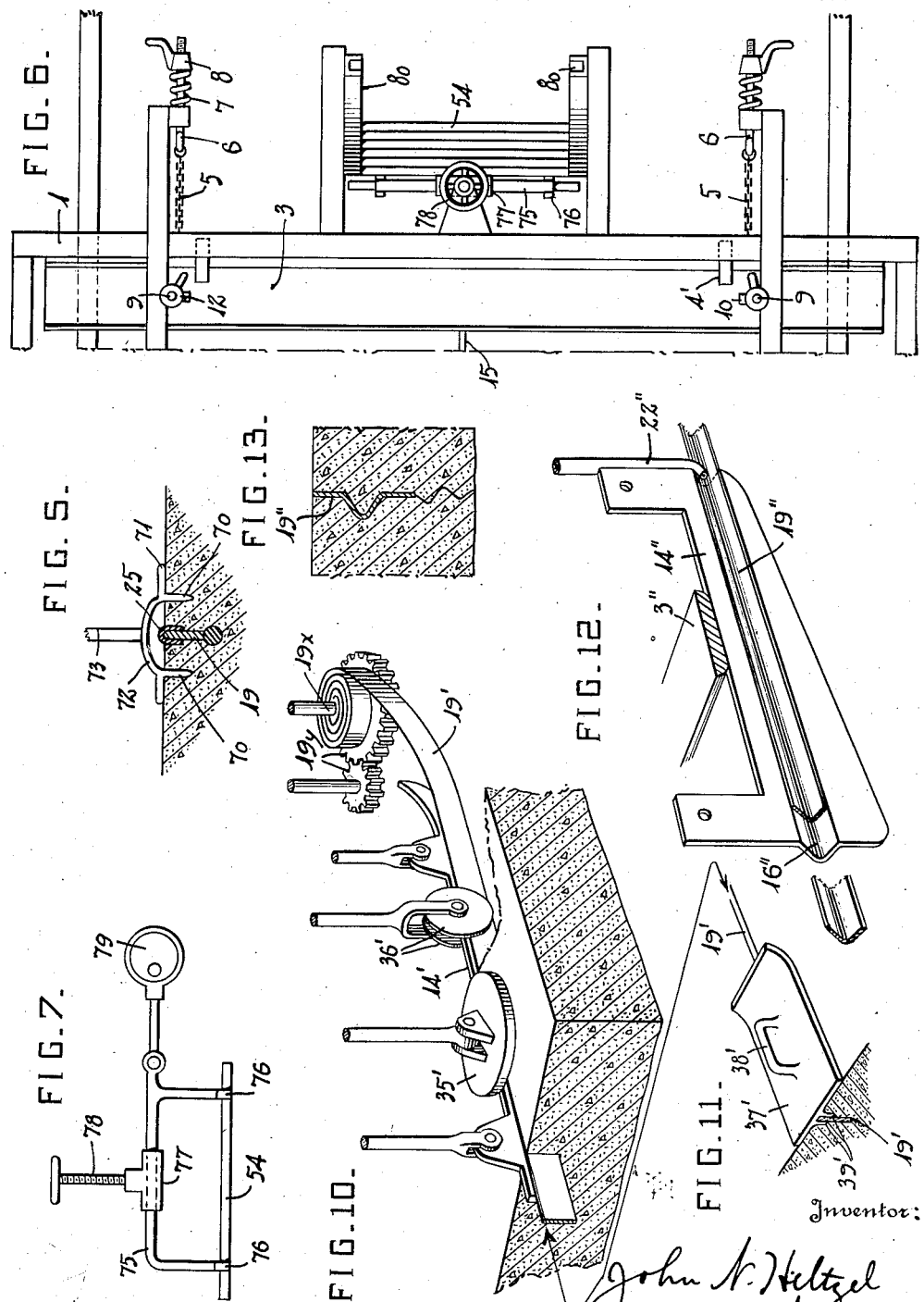

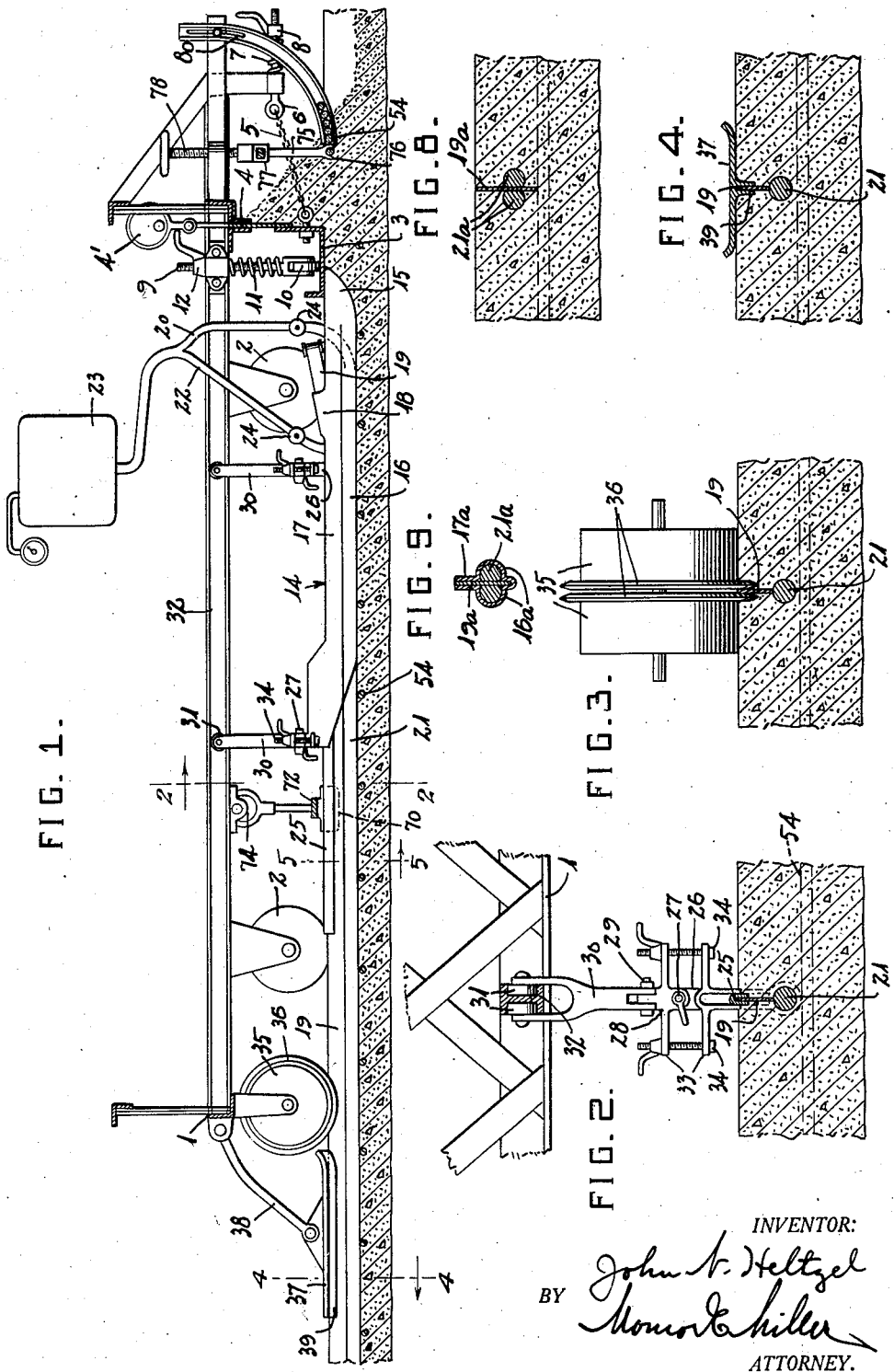

April 2, 1935. J. N. HELTZEL 1,996,153
ROAD BUILDING APPARATUS
Filed Dec. 19, 1929 6 Sheets-Sheet 3
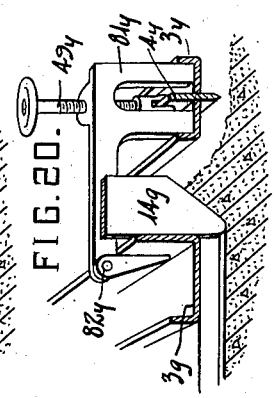
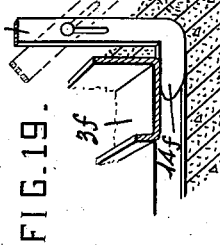
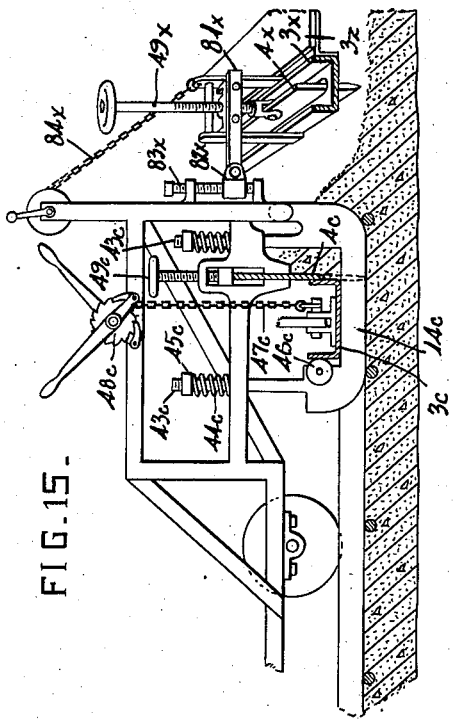
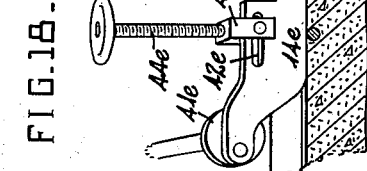
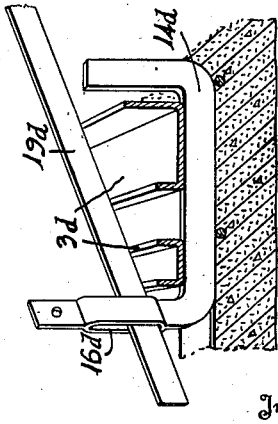
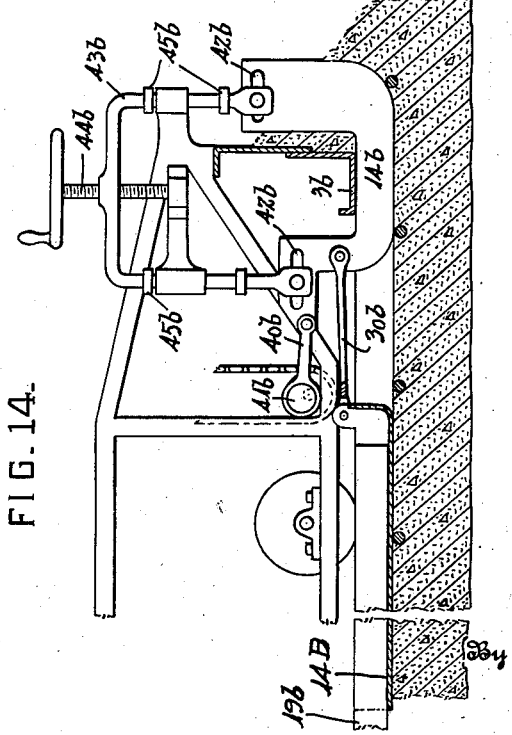
Inventor:
John N. Heltzel
Monroe E. Miller
Attorney.

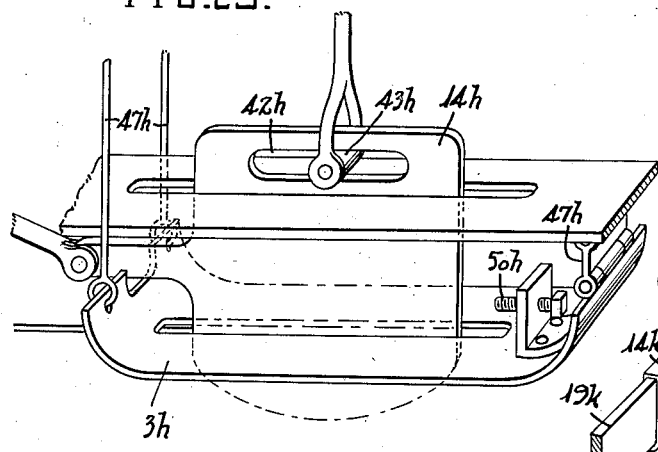
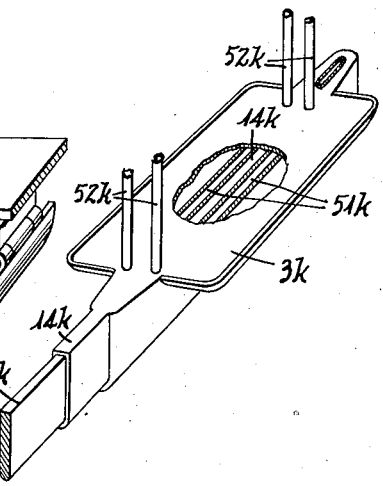
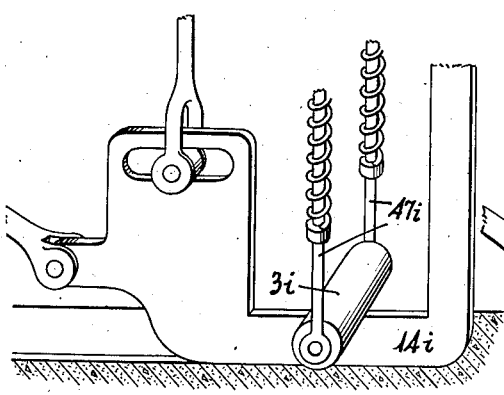
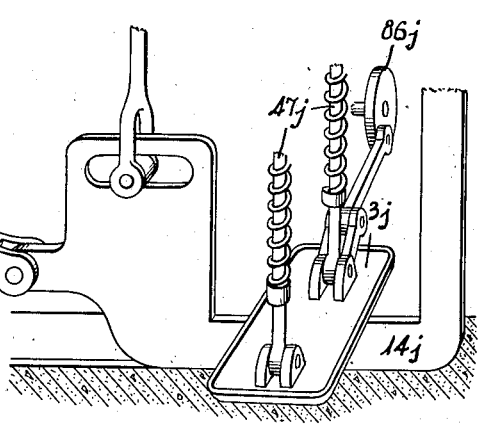
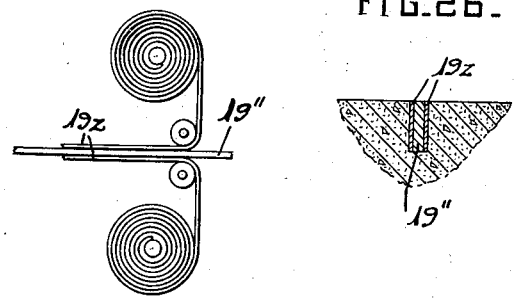
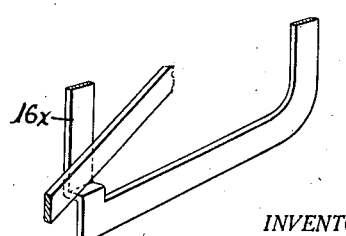

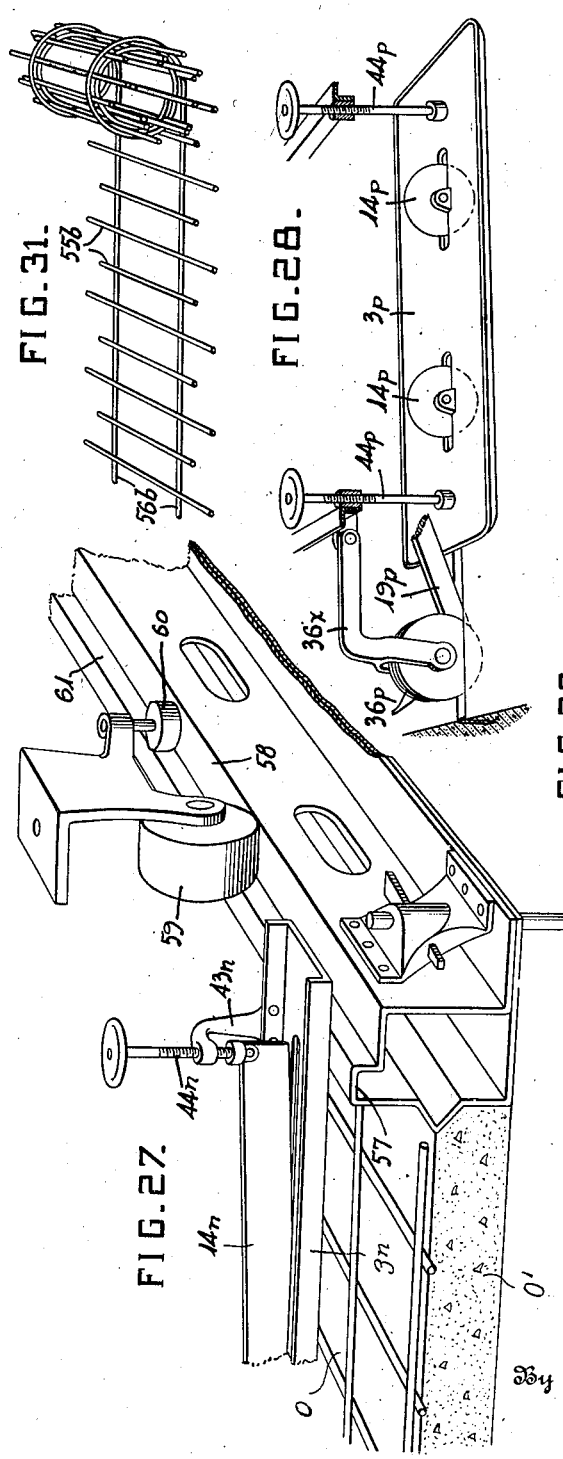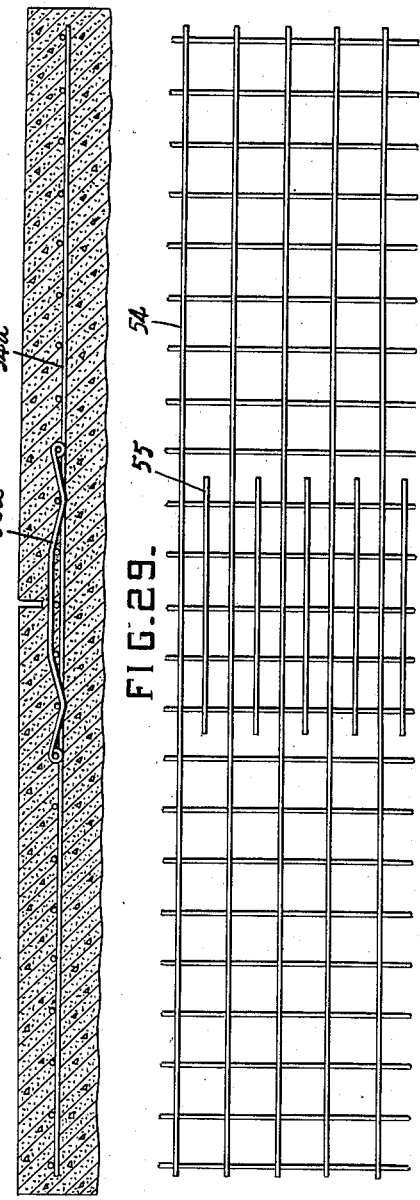

April 2, 1935.   J. N. HELTZEL   1,996,153
ROAD BUILDING APPARATUS
Filed Dec. 19, 1929   6 Sheets-Sheet 6
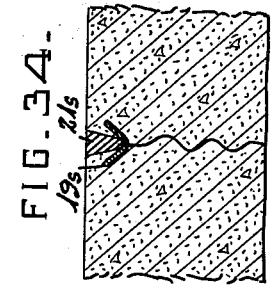
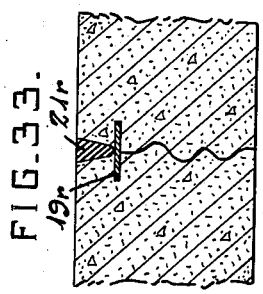
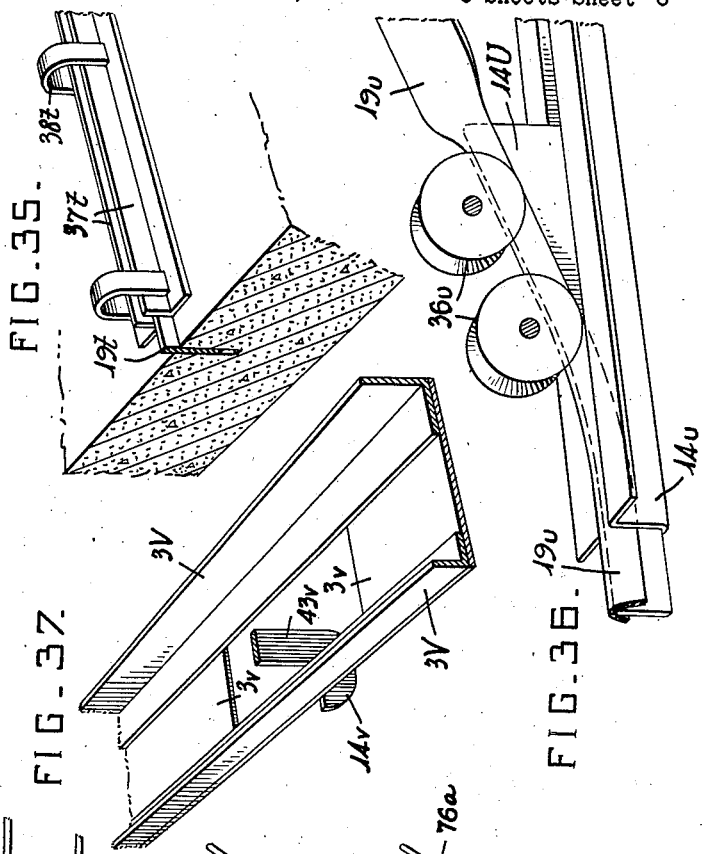
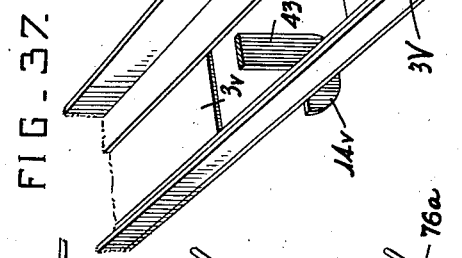
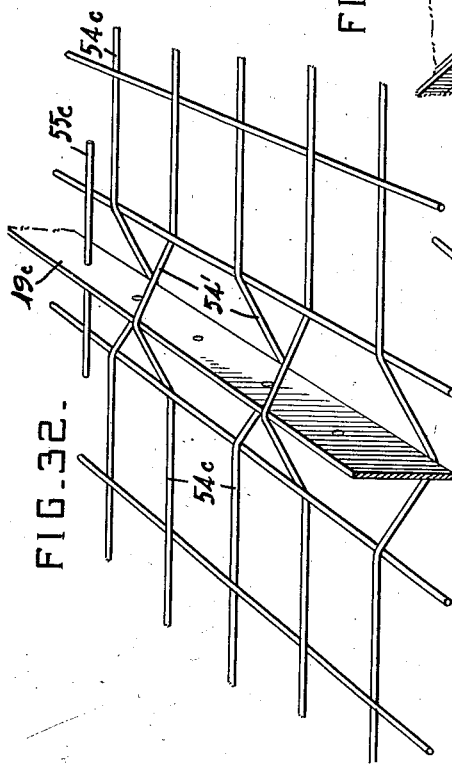
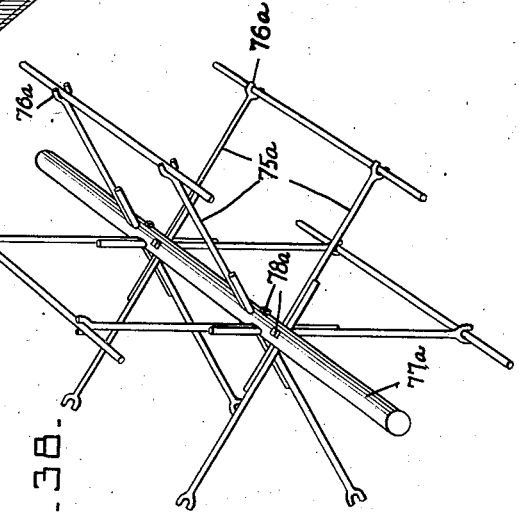
Inventor:
John N. Heltzel
By Thomas E. Miller
Attorney.

Patented Apr. 2, 1935

1,996,153

UNITED STATES PATENT OFFICE 1,996,153

ROAD BUILDING APPARATUS

John N. Heltzel, Warren, Ohio

Application December 19, 1929, Serial No. 415,318

23 Claims. (Cl. 94—39)

The present invention relates to road building apparatus and machines, and aims to provide novel and useful improvements therein.

One object of the invention is the provision of a novel screeding device for striking off and surfacing or finishing the plastic concrete.

Another object is the provision of novel joint installing means.

A further object is the provision of a screed or finishing member and joint installer cooperable in a novel manner.

The invention also has for an object the improvement of the apparatus generally and in its details to enhance the utility and efficiency thereof.

Another object is to provide novel means for installing dowel rods in the road for tying the slabs together across the joint.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a longitudinal section of the improved machine.

Fig. 2 is an enlarged cross section on the line 2—2 of Fig. 1.

Fig. 3 is a front or rear view of the device for rolling the concrete along the joint.

Figs. 4 and 5 are enlarged sections on the respective lines 4—4 and 5—5 of Fig. 1.

Fig. 6 is a plan view of the forward end portion of the machine showing the screed and dowel rod depositor.

Fig. 7 is a front view of the dowel rod depositor, including vibrating means.

Fig. 8 is a cross section of a modified form of joint.

Fig. 9 is a cross section of the joint installing member for producing the joint shown in Fig. 8.

Fig. 10 is a perspective view of a modified construction.

Fig. 11 is a perspective view of a joint edging tool adapted to be used over the joint strip.

Fig. 12 is a perspective view of another modification.

Fig. 13 is a cross section of the joint produced by the device shown in Fig. 12.

Fig. 14 is a view, partly in elevation and partly in section, of a modified screed and joint installing blade in combination.

Fig. 15 is a view, partly in elevation, partly in perspective and partly in section, of another modified screed and longitudinal joint installing blade in combination, with a transverse joint installing blade.

Figs. 16, 17, 18, 19 and 20 are perspective views illustrating further modifications in cooperable screeds and joint installing blades.

Figs. 21, 22 and 23 are perspective views of joint installing blades associated with finishing or surfacing members of different kinds.

Fig. 24 is a perspective view of another modification in the joint installing means.

Fig. 25 is a plan view illustrating the use of two strips for building a joint.

Fig. 26 is a cross section of a joint built with the pair of strips at opposite sides of an intermediate premolded strip.

Fig. 27 is a perspective view illustrating another arrangement of a joint installer associated with a screed or finishing member.

Fig. 28 is a perspective view of still another combination of surfacing member and joint installing means.

Fig. 29 is a plan view illustrating dowel rods assembled with reinforcing mesh.

Fig. 30 is a cross section of a road illustrating a modification in the manner of assembling the dowel rods with the reinforcing mesh.

Fig. 31 is a perspective view illustrating means for applying dowel rods to the reinforcement.

Fig. 32 is a perspective view illustrating a joint strip fabricated with reinforcing mesh.

Figs. 33 and 34 are cross sections of modified forms of joints.

Fig. 35 is a fragmentary perspective view of a modified construction of joint installing and finishing device.

Fig. 36 is a perspective view of another modified construction of joint installing means.

Fig. 37 is a perspective view of a modified combination of screed and joint cutter.

Fig. 38 is a perspective view of a modified form of dowel rod installing device.

The machine comprises a suitable carriage bridge or frame 1 having wheels 2 to roll on the usual side forms or rails between which the road is built.

The screed or strike-off 3 is of channel form as shown, and its front upstanding wall or flange overlaps a blade or apron 4 slidable vertically in and depending from the carriage 1, so that said screed and blade can buck the plastic material in front of same. By using the blade or apron 4 depending from the carriage a screed of small height may be used.

The screed 3 rests on the side form rails and is reciprocated longitudinally of itself transversely of the road, and moves along the blade 4 so that the material in front of the screed and blade will not flow rearwardly between them.

A suitable number of chains or flexible elements 5 are connected with the screed and extend forwardly therefrom for trailing the screed from the forward portion of the carriage, each element 5 being connected to a rod 6 slidable longitudinally in the forward portion of the carriage. A coiled spring 7 surrounds each rod 6 and is confined between the frame and an adjusting nut 8 on the rod in front of the frame.

The springs 7 slide the rods 6 forwardly so as to hold the screed 3 against the blade 4, the rods 6 being yieldable as the screed 3 is reciprocated. The screed is reciprocated manually or mechanically in any suitable manner as well known in the art.

In order to hold the screed down on the form rails a suitable number of vertical rods 9 are provided, each having a roller 10 at its lower end seating on the screed, and the rods are slidable vertically in the frame.

Coiled springs 11 are confined between the frame and rods to yieldingly depress said rods and hold the screed down, and a nut 12 is threaded on each rod to seat on the frame for limiting the downward movement of the rod.

The blade 4 is reciprocated upwardly and downwardly in front of the screed, to work the material vertically in front of the screed and blade. Eccentrics 4' or other means mounted on the frame may be employed for operating the blade, and the blade may be slotted so as not to interfere with the connections of the chains or elements 5.

A joint installing member 14 extends longitudinally rearwardly from the screed, and is provided at its forward end with the nose or blade 15 to extend under the screed 3 in order to separate the stones and coarser aggregate. The rear end of the member 14 is inclined rearwardly, to permit the plastic material to flow or be moved against the lower portion of the joint strip while the upper portion is still engaged and held in position by the member 14, thereby permitting freely flexible or pliant joint strips or ribbons to be deposited true to alinement. The inclination of the rear end of the member 14 also permits said member to be moved rearwardly more readily.

The member 14 has a lower longitudinal tubular portion 16 open at the rear end of said member, and said member is provided above the portion 16 with a flat vertical slotted portion 17 having a mouth 18 at its forward end to receive a strip 19 of paper, metal, fabric or other suitable material to pass rearwardly into and through the portion 17, said strip being supplied by a roll or other suitable means carried by the frame.

A supply pipe or tube 20 is connected to the forward end of the tubular portion 16, for delivering tar, asphaltum or other suitable material into the portion 16 to be discharged from the rear end thereof to form the sealing member 21 for the joint, which is of circular or other suitable cross section.

A pipe or tube 22 may be connected with the portion 17 in rear of the mouth 18 for delivering tar, oil, or other suitable material into the portion 17 on opposite sides of the strip 19, thereby coating the sides of the strip, or impregnating said strip.

The pipes or tubes 20 and 22 may be supplied with material from any suitable source. As shown, they are branched from a common pressure tank 23, and the pipes or tubes have control valves 24 to regulate the flow of material. Other suitable means may be provided for supplying the material.

The member 14 has a rearwardly extending tail 25 of inverted U-shaped cross section to straddle the upper edge of the strip 19 where it leaves the member 14, thereby holding said strip in place, to prevent displacement of the upper edge thereof, while the concrete flows against the lower portion of the strip as the member 14 moves forwardly.

The member 14 is supported for longitudinal movement and vertical and transverse adjustments. The member 14 has upstanding portions 26 connected by pivots 27 with joint members 28 connected by pivots 29 with hangers 30 that have rollers 31 working in a longitudinal rail 32 carried by the carriage. The pivots 27 are arranged with their axes longitudinally of the machine, while the pivots 29 are arranged with their axes transversely, to provide universal joint connections.

The rollers 31 moving along the rail 32 permit the member 14 to be reciprocated longitudinally so that the nose or blade 15 will work into the material below the screed. The hangers 30 may also swing relatively to the rail 32 and member 14 to permit the member 14 to be raised above the concrete. The pivots 27 permit the member 14 to be adjusted transversely to vertical or inclined positions.

The transverse adjustment of the member 14 is facilitated by outstanding arms 33 with which the portions 26 and members 28 are provided, which are connected by adjusting bolts 34 that are adjustable to tilt the member 14 about the pivots 27.

In rear of the member 14 the carriage supports a pair of rollers 35 adapted to roll on the concrete at opposite sides of the strip 19, as seen in Fig. 3, thereby pressing the concrete down smooth along the joint. The rollers 35 have flanges 36 adapted to overlap the upper edge portion of the strip 19 for holding said edge of the strip in place, as well as finishing the edges of the concrete along said strip.

A float 37 is trailed by a link 38 from the rear end of the carriage to smooth the concrete over the joint, and has longitudinal flanges 39 between which the strip 19 passes, to hold the upper edge of the strip in place and to finish the edges of the concrete along said strip, and to realign the strip.

In order to work down the concrete at opposite sides of the joint, where the concrete may be loosened or heaved upwardly, it is preferable to provide a pair of spaders 70 and tampers 71 at opposite sides of the joint, preferably at opposite sides of the tail piece 25. As shown, said spaders and tampers are connected by an arch or yoke 72 disposed astride the tail piece and supported by a shank or stem 73 which may be reciprocated vertically by an eccentric 74 or other suitable means on the frame. The spaders will spade the concrete and depress stones or other larger aggregate, and the tampers 71 will tamp down the concrete, which is subsequently rolled by the rollers 35.

The machine has means for depositing dowel rods in the concrete for tying together the slabs at the opposite sides of the longitudinal joint. As shown, the dowel rod depositor comprises an arched member or yoke 75 having the depending forks 76 at its ends adapted to fit astride a dowel rod 54 to force same downwardly into the plastic concrete, said rod depositor being located in front of the screed, as seen in Figs. 1 and 6. The member 75 is slidable in a head 77 swiveled to the lower end of an adjusting screw 78 mounted in the frame or carriage, whereby said screw may be conveniently rotated for lowering and raising said member 75.

The member 75 may be reciprocated in order to work the rod 54 downwardly into the concrete. As shown in Fig. 7, an accentric 79 is connected with the member 75 to reciprocate said member in the head or carrier 77, which will facilitate the downward movement of the rod 54 into the concrete.

A magazine for supplying dowel rods to the rod depositor is provided, and comprises arcuate channels or guides 80 supported by the frame in front of the rod depositor and receiving the ends of a number of dowel rods 54, whereby said rods may be conveniently supplied from the magazine to a point below the rod depositor as the machine moves forwardly.

In operation the machine is propelled forwardly by suitable means (not shown), and the surplus concrete is shoved forwardly by the screed 3 and blade or apron 4. Said blade prevents the concrete from flowing over the top of the screed, and will also relieve the pressure caused by the material piling up in front of the screed. There is less resistance to the forward movement of the present screed than when a screed is used having a high front wall. The present construction also prevents agitation of the entire bulk of material piled up in front of the screed, in that only the material below the blade 4 in front of the screed is subjected to the action of the screed. The material piled up against the blade will not be compacted as when bearing against a reciprocating screed, but to the contrary such surplus material will remain loose by resting against the blade or plate 4, and the vertical reciprocation of the blade 4 will aid in keeping the material loose and well mixed.

This arrangement also avoids the separation of the fine aggregate from the coarse aggregate such as occurs when the material piles up against a high reciprocating screed which agitates the entire mass of the surplus material transversely. It is a well known fact that when a screed is operating against a mass of material piled up against the screed, the agitation of the screed in pushing the mass of material forwardly, together with the transverse reciprocation of the screed, separates the finer aggregate from the coarse aggregate, and it is found that the finer aggregate settles to the bottom, leaving the coarse aggregate at the top, which is objectionable. By the use of the blade or plate 4, a screed of ordinary or low height may be used, such as ordinary standard channel iron.

The screed has a rectilinear motion, and may be raised off the concrete by any suitable means (not shown).

The dowel rod installer has means for adjustment up and down to various depths of concrete and also means for moving it out of contact from the concrete.

The joint installing member 14 follows in rear of the screed and may be reciprocated longitudinally to force the nose or blade 15 into the material below the screed, said blade separating the stones or coarser aggregate, although in some instances the member 14 need not be reciprocated longitudinally but may move forwardly with the carriage.

The plastic sealing material flows into and through the tubular portion 16 to provide a sealing member 21 in the road, and the material may be such as to remain plastic indefinitely, in order to seal the joint after the concrete breaks below the strip 19, thus preventing water and moisture from passing down through the joint.

The member or material 21 being below the surface of the concrete will be protected from the elements, and is located below the strip 19.

The strip 19 may be of paper, metal, premolded composition, fabric, or the like, and is positioned in the concrete above the sealing material 21. The rear end of the member 14 is cut obliquely so that the strip 19 in emerging from said member will result in the concrete flowing against the lower portion of the strip 19 first before the upper edge thereof emerges from said member. In some cases ribbon steel may be used which may be trailed from the member 14 so as to be drawn forwardly with the machine, thereby producing a hair line cut or incision in the concrete above the sealing material 21. Suitable plastic material may be delivered into the slotted portion 17 for coating the sides of or impregnating the strip 19, or if a trailed ribbon seal strip is used then oil or other material may be used for lubricating same so that it will slide forwardly in the semiset concrete without breaking. It is also possible in some instances to remove the strip from the concrete for salvaging the strip and using same repeatedly, the strip being left in the concrete until it has received a semi- or complete set.

Therefore, the strip may either be left in the concrete, may be trailed from the machine under suitable circumstances, or may be left in the concrete for a period of time and then removed therefrom.

The tail 25 of the member 14 will hold the upper edge of the strip 19 in place while the concrete is floated or troweled by hand at the opposite sides of the joint. This will prevent the strip from being displaced during such floating.

The rollers 35 and float 37 follow in rear and finish the surface of the concrete at opposite sides of the strip, while holding the upper edge of the strip in place. The spaders 70 and tampers 71 work the material down in front of the rollers 35.

The member 14 may be adjusted to install the joint at right angles or perpendicularly to the road, or when building a road along a curve, with the road inclined transversely, the member 14 may be adjusted to a vertical position while the machine is inclined transversely, one side of the machine being higher than the other.

As the machine is moved forwardly, the dowel rods 54 are removed from the magazine 80 and deposited into the concrete in front of the screed by the depositing member 75. These rods may be deposited at suitably spaced distances in the concrete, and the blade or member 14 has its forward end curved so as to depress the rods 54, if necessary, to bring them below the lower edge or portion of said member 14.

Fig. 8 illustrates the use of sealing material 21a at opposite sides of the joint strip or material 19a, and the joint installing member for this type of joint is shown in Fig. 9, the slotted portion 17a for the strip 19a having the outstanding offsets 16a for the material 21a.

Fig. 10 illustrates a joint installing blade 14' to move in the plastic concrete with the strip 19' extending along one side of said blade. A pair of disks 36' rotatable on a transverse axis are disposed astride the blade and strip and overlap the opposite sides thereof, to hold the strip against the blade and to work the concrete downwardly along the opposite sides of the joint.

A rotatable float and tamper member or disk 35' is disposed across the upper edge of the blade 14' to compact the surface of the concrete over the upper edges of the blade and strip, said member being rotated about a vertical axis.

The strip 19' may be wound on a reel or spool 19x, so as to be unwound therefrom as the machine moves forwardly. Said strip may be of thin ribbon steel or other suitable material, so that after a length of the strip has been let into the concrete, the strip may be wound back onto the reel or drum 19x, by suitable gearing, thereby withdrawing the strip from the road in rear of the blade 14', after which the machine may start forwardly again. The strip 19' may thus be alternately let into the road and withdrawn therefrom as the building of the road progresses, and gearing 19y may be hand or power driven to wind up the strip.

A float 37', as shown in Fig. 11, may be used over the joint strip 19' to finish the surface of the concrete over the joint and to form the edges of the slabs, said float having a handle 38' for conveniently moving the float, and also having depending flanges 39' to fit astride the joint strip and form the edges of the slabs. It is possible to fasten the float 37' on the end of the strip 19' if it is trailed from the machine or retracted, so that the float in being trailed from or drawn toward the machine will automatically finish the concrete over the joint. The float 37' or a plurality of them will also hold the strip 19' down in the concrete and will also prevent the strip from cutting down into soft concrete below the intended depth.

It is also possible to deposit joint strips of rubber or other elastic material in the concrete, which may be conveniently withdrawn from the concrete after it has set partially or completely. Thus, in pulling one end of the rubber or resilient strip from the groove, the strip may be stretched or attenuated, which will decrease the thickness of the strip so that it may be pulled readily out of the groove or slot, and said strip may be used repeatedly.

Fig. 12 illustrates a blade 14" to move in the plastic concrete, and which may be of any suitable cross section desired. As shown, the blade has a longitudinal offset portion 16" to provide a tongue and groove joint, as seen in Fig. 13. A suitable float or finishing member 3" is movable over the upper edge of the blade to finish the concrete. Oil, tar, or other suitable liquid or semi-liquid is delivered at the forward end of the blade 14" through a suitable nozzle or pipe 22" to spread across the opposite sides of the blade, in order to provide a division or separation in the concrete, as seen at 19" in Fig. 13. The liquid or semi-liquid material may fill the slot or kerf to provide the joint, or the material used may be such as to be removed. Volatile liquid may be used which will evaporate after the concrete has set, thereby leaving a slot which may be filled with any suitable sealing material. A strip or member 19' may fit in or on the offset portion 16" to form a definite tongue and groove separation in the concrete.

Fig. 14 illustrates a joint installing or cutting blade 14b extending under the screed 3b, and reciprocated longitudinally by means of a link 40b connecting said blade with an eccentric 41b of actuating means on the carriage, although other means for reciprocating the blade may be used.

The blade 14b has upstanding terminal portions in front and in rear of the screed provided with horizontal slots 42b slidably engaging a supporting yoke 43b which is slidable vertically in the frame, and an adjusting screw 44b is provided for adjusting the yoke and blade vertically. Adjustable stops 45b are provided on the limbs of the yoke to limit the upward and downward movements thereof.

A longitudinal joint installing blade 14b follows the blade 14b, and is connected thereto by a link 30b to be reciprocated longitudinally, and the joint strip or member 19b is deposited by the blade 14b into the concrete. As shown, the blade 14b has its upper edge open to receive the joint strip or member, and the longitudinal reciprocation of the blade 14b will cause the plastic concrete to fill in back of the blade against the sides of the joint strip or member. The blade 14b, which may be of any suitable length or section, may be trailed in the concrete intermittently—that is to say that the link 30b may be disconnected from the forward cutter 14b permitting the screeding machine together with the forward cutting member 14b to advance for performing the rough screeding operation. The machine may advance as much as 100 feet more or less, while 14b would remain stationary in the plastic concrete this distance in the rear. The machine would then be backed up and linked 30b would be connected to the longitudinal blade 14b and again trailed through the plastic concrete for a distance of say 100 feet more or less. Provided conditions permitted, the same operation would be repeated whereby the link 30b would be disconnected and the longitudinal blade 14b would remain stationary in the concrete for a period of time as conditions would permit. It is understood that blade 14b could be used without attaching it to the forward blade 14b as it might be found desirable to trail the rear blade by attaching it direct to the machine frame without reciprocating it; at the same time it will be understood that the blade 14b could be used without depositing the joint material 19b. The blade 14b may also be attached to standard finishing machines for intermittent trailing though plastic concrete for producing a joint.

Fig. 15 shows the joint producing blade 14c below the tamper 3c. The blade has upstanding front and rear stems 43c slidable in the frame, and the blade is yieldingly raised by coiled springs 44c on said stems confined between the frame and nuts 45c threaded on the terminals of the stems. The blade is thus held up against the tamper, and the rear portion of the blade has a roller 46c bearing against the rear portion of the tamper to guide said tamper.

One or more chains 47c are connected to the tamper and to suitable winding or lifting means 48c on the carriage for conveniently raising the members, and the springs 44c will lift the blade 14c with the tamper.

The blade or baffle plate 4c is adjustable vertically by means of one or more screws 49c, in order that said plate will provide a transverse joint cutting or installing blade. Thus, the plate or blade 4c may be forced downwardly into the concrete, as seen in dotted lines, to cut or install a joint. Said plate or blade may thus be used for cutting a groove or slot in the concrete to receive a joint strip or joint material, or the plate or blade may be used for depressing a paper, metal or other joint or member into the concrete.

Fig. 15 illustrates another transverse joint installer comprising a transverse channel member 3x to rest upon the concrete and having a slot through which the joint installing blade 4x is movable. A platform 3z for workmen is carried by the member 3x. Said blade is supported by adjusting screws 49x mounted in brackets 81x pivoted to nuts 82x mounted on vertical adjusting screws 83x carried by the frame so that the brackets 81x may be adjusted to permit the member 3x to rest flatly on the concrete. A chain 84x is connected to each bracket 81x and is connected to a drum or windlass 85x on the frame to support the member 3x on the concrete, and said member may be swung upwardly with the brackets 81x to support said member and the blade above the concrete.

To use the blade 4x, the machine is backed up to bring the member 3x above the finished surface along the line of the proposed transverse joint. The member 3x is then swung downwardly to rest on the concrete, and the screws 49x are rotated to force the blade 4x down into the concrete, thereby cutting a transverse slot or groove in the concrete, to receive a joint strip or material.

Fig. 16 illustrates the use of a pair of screeds 3d, one in rear of the other, reciprocating in opposite directions over the joint installing blade 14d. The rear upstanding terminal of the blade has a slotted portion 16d through which the joint strips 19d may be slid to enter the slot or groove in rear of the blade.

Fig. 17 shows the rear terminal portion 16x of the blade offset for the passage of the joint strip, instead of using the slotted portion 16d as shown in Fig. 16, or the blade may not have either the slotted portion 16d or the offset portion 16x so that the joint strips may be moved rearwardly over the rear end of the blade into the slot or groove.

Fig. 18 illustrates a joint cutting blade 14e connected at one end with a crank disk 41e for reciprocating the blade, the forward end or nose of which moves under the screed 3e. Said blade has a longitudinal slot 42e slidably engaging the carrier 43e which is adjusted vertically by the screw 44e.

The screed 3e is provided with dowel rod installing means, including arches 75e secured within the screed over a slot through which the dowel rod 54e is moved downwardly into the concrete, and a screw 78e is threaded through each arch and has a fork 76e swivelled on the lower end thereof to straddle the dowel rod to force the rod downwardly with the screw.

Fig. 19 illustrates a blade 14f extending from in front of the screed 3f rearwardly under the screed, and said blade has an upstanding shank 43f having a pin and slot connection with a support to permit the blade to be moved into and out of operative position, and to be raised, without manipulating the screed.

Fig. 20 illustrates a joint cutting blade 14g extending downwardly in front of the screed 3g. A transverse joint installer is also shown comprising a channel member 3y adapted to rest on the surface of the finished road, when the machine is backed up, as described in connection with Fig. 15. The member 3y is carried by brackets 81y pivoted, as at 82y, to the screed 3g, so that the member 3y may be raised off the concrete when not in use. The transverse joint blade 4y is movable downwardly through a slot in the member 3y and is raised and lowered by adjusting screws 49y, one of which is carried by each bracket 81y. The cutter or blade 4y may be reciprocated transversely with the screed.

In Fig. 21 a roller 3i for rolling and compacting the concrete is disposed across the joint cutting blade 14i, and said roller is supported by spring depressed rods 47i.

In Fig. 22 a spring-pressed float and tamper 3j is disposed across the blade 14j, and is reciprocated by a crank disk 86j or other means. The blade 14j may be reciprocated longitudinally or may be fixed to the frame. The rods 47j supporting the float and tamper member 3j may be used to give said member 3j a tamping action while the crank disk 86j gives said member a floating action.

Fig. 23 shows a joint cutting blade 14h which is reciprocated longitudinally, being provided with a slot 42h receiving a roller 43h of the blade supporting member or hanger.

The blade 14h works in a longitudinal slot of a float 3h which floats the surface of the concrete along the joint, and said float is suspended by links 47h permitting the float to vibrate longitudinally, an adjustable screw 50h being mounted on the float for the contact of the blade 14h in order to vibrate the float.

Fig. 24 illustrates a hollow joint installing member 14k below a float 3k, with chambers or spaces 51k at opposite sides of the member 14k for the flow of steam, hot water or other heating fluid for heating the plastic composition which is discharged from the member 14k to provide the joint strip or member 19k. Pipes 52k are connected to the opposite ends of the chambers 51k for the flow of fluid into and out of said chambers. The steam, hot water or other heated fluid may be used for softening or melting the material in the joint installing member 14k.

Fig. 25 discloses the idea of using two joint strips 19z passing from rolls over guide rollers to enter the plastic concrete, and such strips, which may be of thin paper, may be disposed on opposite sides of an alining strip 19″, as seen in Fig. 26. The strip 19″ may be left in place between the strips 19z, or may be trailed or moved forwardly or removed, to leave a space in the strips 19z, or to permit said strips to be moved together.

Fig. 27 illustrates the screed or strike-off 3n having a longitudinal slot through which a transverse joint installing blade 14n is movable, said blade being moved upwardly and downwardly by adjusting screws 44n mounted in brackets 43n secured to the screed or strike-off. The device may thus be used as a finishing or surfacing member and for installing transverse joints. The screed may be reciprocated as usual, and such reciprocation during the lowering of the blade 14n will enable the blade to work down into the concrete with a sawing action.

It will be noted that the transverse installing blade 14n may be lowered down through the slotted screed member 3n to a distance above the sub-grade, so that the blade 14n may be used to strike off the lower course of concrete 0l. After the bottom course has been struck off to the height desired, the joint member 14n is raised out of contact with the lower course of concrete and the machine to which the screed and joint member is attached is backed up permitting the reinforcing steel O to be deposited on the top surface of the lower course 0l after which the top course of the concrete is then applied and the top course is then struck off or screeded by using the transverse screed member 3n. It will be understood that when the screed member 3n is in operation for screeding purposes, the joint blade 14n is disengaged from the slot and raised to a point more or less above the bottom surface of the screed member 3n.

As shown in Fig. 27, the side form rail on which the screed 3n rests has an inner raised tread portion 57 on which the screed rests, and has an outer tread portion 58 at a lower level on which the finishing machine wheels 59 travel, and rollers 60 supported from the carriage may bear against the wall 61 between said tread portions to limit transverse movement of the carriage on the rails, it will be noted that the blade 14n may be utilized to level off a bottom course 0' to accommodate reinforcing 0.

In Fig. 28 there is provided a float 3p with disks 14p mounted thereon and extending downwardly through slots in the float for cutting a groove in the concrete, said float being adjusted vertically by means of adjusting screws 44p.

A pair of disks 36p are mounted in a hinged arm 36x to move in the groove or slot, and the joint strip 19p may be moved between said disks into said groove or slot.

Fig. 29 illustrates the reinforcing mesh or fabric 54 which is embedded in the concrete for reinforcing same, and the mesh extends across the line of the longitudinal joint for tying the opposite slabs together. This mesh is usually made of wire, and in order to prevent the mesh from tearing apart at the joint, dowel rods or heavy wires 55 are placed on the mesh to be embedded in the adjacent portions of the slabs. These rods or wires 55 may be assembled with the mesh during the building of the road or may be welded or otherwise secured to the mesh at the factory.

The forward ends of the joint installing members or blades hereinbefore described are rounded or inclined in order to depress the reinforcing mesh and dowel rods down to the proper depth so as to be disposed below the longitudinal joint.

Fig. 30 illustrates how the dowel rods or wires 55a may be attached to the reinforcing mesh or fabric 54a, with the ends of said dowel or wires bent around longitudinal wires or rods of the mesh.

Fig. 31 illustrates the dowel rods or wires 55b welded or otherwise secured to longitudinal wires 56b, whereby the rods may be rolled up for convenient transportation and handling, and the device may be unrolled on the reinforcing mesh for conveniently placing the dowel rods or wires on said mesh.

Fig. 32 illustrates the rods 54c of the reinforcing mesh or fabric alternately offset upwardly and downwardly, as at 54', to extend across the upper and lower edges of the joint plate or strip 19c, to fabricate the joint strip or plate with the mesh or the strip or plate may be inserted between the portions 54'. The dowel rods 55c may extend through the joint strip or member which has openings to receive the dowel rods.

Fig. 33 illustrates a strip 19r installed in a horizontal plane below a groove in which filler material 21r is poured or inserted, while Fig. 34 illustrates the strip 19s of V-shape below the filler or joint material 21s. The strip 19s may be installed by the method and tools disclosed in my Patent Number 1,697,563, granted January 1, 1929.

Fig. 35 illustrates a method of installing joint strip 19t flush with the surface of the concrete to facilitate floating the surface then withdrawing the strip slightly to project above the concrete as shown, and illustrates a drag composed of spaced parallel longitudinal angle irons or members 37t, which are adapted to fit astride the joint strip 19t, the upper edge portion of which projects above the surface of the concrete. The members 37t may be connected by yokes 38t, and the drag may be of any suitable length. The slot of the drag registers with the slot in the concrete, and the members 37t will smooth or finish the surface of the concrete along the opposite sides of the joint strip, as well as maintaining the strip in alignment or realigning the strip. The drag may be trailed from the machine in lieu of the float 37 shown in Figs. 1 and 4, especially when the strip projects above the surface of the concrete.

Fig. 36 depicts a blade 14u of inverted U-shaped cross section, having outturned flanges to move on the surface of the concrete. A plate 14U is mounted within the blade 14u, and has an inclined edge, with the rear portion of the blade of reduced height and preferably projecting from the rear end of the blade 14u. A strip 19u of paper or other foldable material is fed over the inclined edge of the blade 14u and folded downwardly, by folding disks 36u overlapping the plate 14U, so that the strip 19u will be deposited in the concrete with the edges lowermost and the fold uppermost. The blades may be moved forwardly in the concrete to deposit the folded strip in rear.

Fig. 37 illustrates a screed composed of the front and rear angle irons 3V, and screed plates 3v secured thereto for screeding the surface of the concrete, the forward angle iron or member 3V being capable of bucking the concrete, and the plates 3v smoothing or floating the concrete. The plates 3v are spaced apart at the center of a road or at the point where the joint is to be installed, and the opening permits surplus concrete along the joint to rise through the opening and to fill in any depressions along the joint, so as to avoid depressions or low places in the surface of the road along the joint.

The joint plate 14v is similar to that shown in Fig. 19, being extended rearwardly below the rear angle iron 3V from a depending shank 43v. The joint blade may be rigid with the frame or may be reciprocated longitudinally, or may be of various kinds as hereinbefore disclosed.

Fig. 38 illustrates a modified form of dowel rod installer which may be used in lieu of the dowel rod installer at the forward end of the machine as shown in Fig. 1. Radial pairs of rods 75a are provided at their outer ends with forks 76a to receive the dowel rods, and the rods or arms 75a are slidable or adjustable in a shaft 77a by means of set screws 78a, or the like.

The installer is adapted to have a rolling motion, so that the dowel rods will be moved downwardly and forced into and deposited within the plastic concrete, it being obvious that the installer is mounted for rotation above the concrete and that the lower ends of the lowermost arms 75a enter the plastic concrete to depress the dowel rods thereinto. The dowel rods may be conveniently placed in the forks 76a to be moved downwardly into the concrete.

Having thus described the invention, what is claimed as new is:

1. A road building machine comprising a carriage, a transversely reciprocable screed, a plate depending from the carriage and overlapping and contacting with said screed, and yieldable means for holding said screed against said plate.

2. A road building machine comprising a carriage, a transversely reciprocable screed, a plate depending from the carriage and overlapping and contacting with said screed, and flexible spring means connected to the screed and carriage for holding the screed against said plate.

3. A road building machine comprising a carriage, a transversely reciprocable screed, and a vertically reciprocating blade suspended from the carriage independently of the screed in contact with and in front of the screed.

4. A road building machine comprising a transverse reciprocating screed, having an opening approximately midway its ends; a joint cutting blade associated with the screed through the opening.

5. A road building machine comprising a carriage operating on side forms, a transverse reciprocating screed for screeding top surface, a member associated with the screed to be lowered below the bottom surface of the screed to level a lower course of concrete to accommodate reinforcing steel and means for reciprocating both members.

6. A joint cutting apparatus comprising a transversely reciprocating screed; a transverse joint cutting member hingedly connected to said screed for movement to and from the concrete and means for reciprocating both named members.

7. A grooving device for plastic material comprising a frame having a screed mounted adjacent to one end and a cutting device carried by the frame in position to form a slot in the material, the forward portion of the cutting device being disposed beneath the screed.

8. In a road building machine, a blade, a screed behind the blade and overlapping the lower portion only of the blade, and means to press the screed yieldably forward against the blade.

9. In a road building machine, a vertically-reciprocating blade suspended above the form line, a transversely-reciprocating screed of low height having an upper edge engaging back of the lower edge of the blade, means to yieldably urge the screed down to form level, and yieldable means to draw the screed forwardly against said blade.

10. In a road building machine, a screed, a dowel-rod depositor in front of the screed, and a joint-installing means behind and partly under the screed to install joint material and depress the dowel rods.

11. In a road building machine, a screed, a dowel-rod depositor forwardly of the screed, and a joint-installing device following the screed to install joint material and depress the dowel rods.

12. In a road building machine, a screed, a dowel-rod depositor forwardly of the screed, a joint-installing device following the screed to install joint material and depress the dowel rods, and a tamper following the joint-installing device.

13. In a road building machine, a joint-installing device for installing joint material to a desired depth in the road and having means to depress dowel rods below the zone of the joint material, and a dowel-rod depositor forwardly of the device.

14. In a road building machine, a screed, a dowel-rod depositor situated to deposit dowel rods below the level of the screed in the loose mass of concrete forwardly of the screed, and a joint-installing device for installing joint material to a desired depth in the screeded concrete having means to depress the dowel rods to a depth below the joint material.

15. The method of installing dowel rods in plastic concrete of a road under construction, consisting of placing a dowel rod on the surface of the plastic concrete and then engaging the dowel rod with pressure means associated with the screed and reciprocating the screed transversely of the roadway while said pressure means is in contact with the rod to force the rod into the plastic material.

16. A dowel rod installer, comprising a carriage movable over a roadway under construction, a screed carried by the carriage to operate on the plastic material, means associated with the screed to contact dowel rods to be deposited in the plastic concrete by reciprocating movement of the screed while said pressure means are in engagement with the dowel rods to force the rod below the surface of the plastic concrete.

17. In a road building machine, a carriage spanning a plastic roadway under construction, a screed at the forward portion of the carriage, and a joint-forming member extending back of the screed supported from the carriage for back and forth motion longitudinally of the carriage and relatively to the carriage.

18. A road building machine comprising a carriage movable over a plastic concrete roadway under construction, a joint strip depositor supported by said carriage movable in the plastic concrete to deposit joint strip, and a drag float trailed by said carriage behind the depositor and having spaced longitudinal members engaging at opposite sides of the deposited joint strip to realign said joint strip.

19. A road building machine comprising a carriage movable over a plastic concrete roadway under construction, a joint strip depositor supported by said carriage to move in the plastic concrete and deposit joint strip, and spaced rollers supported by the carriage behind the depositor and having discs set apart to engage opposite sides of the strip whereby to hold the strip to alinement progressively as the rollers depress the concrete at opposite sides of the strip.

20. A road building machine comprising a wheeled carriage spanning a plastic concrete road under construction, a surfacer carried by the carriage to reciprocate transversely over the surface of the plastic concrete, and a joint cleaving implement carried by the carriage to reciprocate longitudinally of the road and under the surfacer to produce a separation in the plastic concrete longitudinally of the road.

21. A road building machine comprising a wheeled carriage, a screed carried forwardly of the carriage to surface road material, supporting means on the screed, screw members threaded in said supporting means, a blade attached to said screw members, and means for rotating the screw members to move the blade down below the screed to level road material below the screed, and for lifting said blade up above the screed level when the screed is to be used to surface the road material.

22. A road building machine comprising a wheeled carriage adapted to be moved over a road under construction, a transverse surfacing screed carried by the carriage, an adjustable plate carried by said screed to be moved to a position below the under surface of said screed to level off a course of road material, and means for raising the plate to a point above the undersurface of the screed to permit a second course of material to be screeded by said screed.

23. A road building machine comprising a wheeled carriage moving on side forms and spanning a road under construction, a screed to rest on the side forms and moved forward by said carriage, means carried by said screed to be moved to a position below the undersurface of the screed to level off a course of road building material to an elevation spaced below the undersurface of the screed, and means for raising said last named means to a point above the undersurface of said screed to permit the screed to surface a second course of road material to a level of the top surface of the side forms.

JOHN N. HELTZEL.